United States Patent [19]
Winton

[11] 3,809,035
[45] May 7, 1974

[54] AIR ADMISSION VALVE FOR INTERNAL COMBUSTION ENGINES EQUIPPED WITH POLLUTION CONTROL VALVE

[75] Inventor: Herbert D. Winton, Woodland Hills, Calif.

[73] Assignee: Ballmatic Corporation, Orange, Calif.

[22] Filed: Aug. 25, 1971

[21] Appl. No.: 174,675

[52] U.S. Cl. .......................... 123/119 B, 123/119 D
[51] Int. Cl. ..................... F02m 25/06, F02m 23/08
[58] Field of Search .................... 123/119 B, 119 D

[56] References Cited
UNITED STATES PATENTS

| | | | |
|---|---|---|---|
| 2,188,175 | 1/1940 | Condon | 123/25.52 |
| 3,550,570 | 12/1970 | Watson, Jr. | 123/119 B |
| 3,059,628 | 10/1962 | Linn | 123/119 B |
| 3,463,132 | 8/1969 | Krieck | 123/119 B |
| 3,166,061 | 1/1965 | Weiser | 123/119 B |
| 3,176,670 | 4/1965 | Sinibaldi | 123/119 B |
| 3,557,763 | 1/1971 | Probst | 123/119 B |

FOREIGN PATENTS OR APPLICATIONS
1,030  3/1926  Australia ........................ 123/119 B

*Primary Examiner*—Al Lawrence Smith
*Attorney, Agent, or Firm*—Herzig & Walsh

[57] ABSTRACT

The invention is an automatic air inlet control valve for admitting additional air into the fuel mixture in internal combustion engines. The air valve is positioned in the pipe or conduit connecting the crankcase to the manifold and having a pollution control valve in it. The air valve body has heat radiating fins to produce a cooling effect on inlet air passing through the valve. The valve operates automatically depending upon the degree of vacuum and provides an auxiliary air mixing device which improves engine efficiency and additionally supplies additional air to mix with the fumes emanating from the crankcase and passing through the pollution control valve, thereby permitting improved combustion of these fumes. Thus, this reduces the amount of air pollution expelled from the exhaust pipe of the internal combustion engine.

5 Claims, 3 Drawing Figures

PATENTED MAY 7 1974

3,809,035

INVENTOR
HERBERT D. WINTON

BY
Herzig + Walsh
ATTORNEYS

AIR ADMISSION VALVE FOR INTERNAL COMBUSTION ENGINES EQUIPPED WITH POLLUTION CONTROL VALVE

SUMMARY OF THE INVENTION

The invention is a device for use in automatically controlling an addition of air to the fuel mixture and to the engine fume mixture entering an internal combustion engine through the carburetor and through the pollution control valve. As is common knowledge today, control of pollutants emitted to the atmosphere from the exhaust of internal combustion engines is an acute problem to which major attention is being given. A degree of control over such pollutants is realized by way of the use of pollution control valves. Typically, this is a metering type of valve installed in a line or conduit connected between the crankcase and the intake manifold. Through this connecting conduit, crankcase air laden with fumes resulting from blow by past the cylinders is drawn out of the crankcase and returned to the cylinders to be consummed therein. Typically, the pollution control valve is an automatic type of metering valve which controls the volume of fume laden air which passes through it to the intake manifold to provide for good performance of the engine. Various types of pollution control valves are known in the prior art.

It has also been known in the prior art and prior to the time that the use of pollution control valves became common, to provide an air valve type of device for admitting additional air to the fuel mixture in an internal combustion engine by way of a separate air admission valve. This type of valve typically, is one that is responsive to vacuum conditions in the intake manifold, and it variably controls the admission of additional air to the pipe connection between the carburetor and the intake manifold. This type of valve will shut off the extra air supply when the engine is being started while allowing entry of additional air depending upon the vacuum being drawn in the intake manifold by the engine.

The herein invention provides a system or arrangement wherein an air admission valve for admitting additional air is provided in the line connected between the crankcase and the intake manifold which also has in it the pollution control valve. This air admission valve again provides an automatic device which will shut off the supply of additional air when the engine is being started or is idling, but will permit entry of extra air depending upon the vacuum produced by the engine.

The primary object of the invention is to provide improved means for providing this additional air supply and, more particularly, that it is supplied to the line from the crankcase to the intake manifold having the pollution control valve in it.

A further object is to realize a more efficient engine operation by reasons of the auxiliary air mixing device.

A further object is to realize the purpose at the same time of automatically supplying additional air to the fumes emanating from the engine crankcase and being passed through the pollution control valve. Thus, the system provides improved combustion of these fumes and results in a reduction of the amount of air polluting fumes expelled from the exhaust pipe of the engine.

BRIEF DESCRIPTION OF THE DRAWINGS

Further objects and additional advantages of the invention will become apparent from the following detailed description and annexed drawings, wherein.

DESCRIPTION OF THE PREFERRED EMBODIMENT

Figure 1:
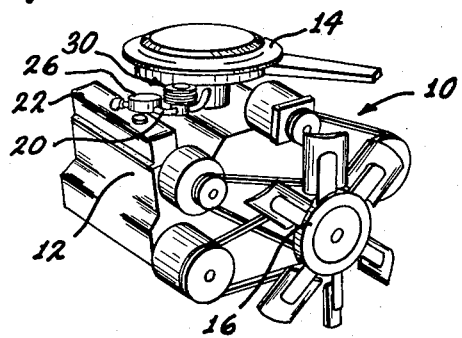
FIG. 1 is a pictorial view of a typical automotive internal combustion engine having the air admission valve of the invention installed in the line having in it the pollution control valve.

Referring now to various figures of the drawings, FIG. 1 shows a typical automotive internal combustion engine which is of a V-type having two banks of cylinders. The engine as a whole is designated at 10, and one of the banks of cylinders is designated at 12. The engine is of course provided with a carburetor and an air intake filter within a housing as designated at 14. The engine has a fan designated at 16, and the usual belt-driven auxiliaries including generator, fuel, and lubricating pumps, etc.

FIG. 1 illustrates a typical type of installation wherein there is a conduit connected between the engine crankcase and the intake manifold for returning crankcase gasses back to the engine. This line or conduit for crankcase gasses is designated at 20; and in the typical type of installation, it may be connected to the rocker arm cover as designated at 22. The other end of this line or conduit connects to the intake manifold of the engine. In the line 20, is the pollution control valve 26 which may be of a type well known in the art. The function of such a valve is also well known, as described in the foregoing. Also positioned in the line 20 is the air admission valve as designated at 30.

Figure 2:
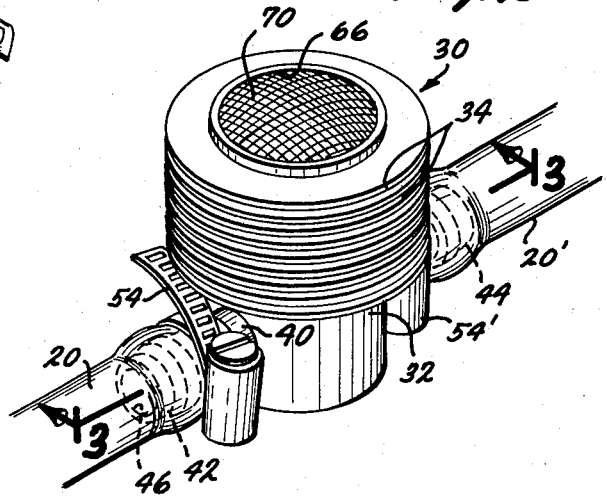
FIG. 2 is a perspective view of a preferred form of the air admission valve of the invention.
Figure 3:
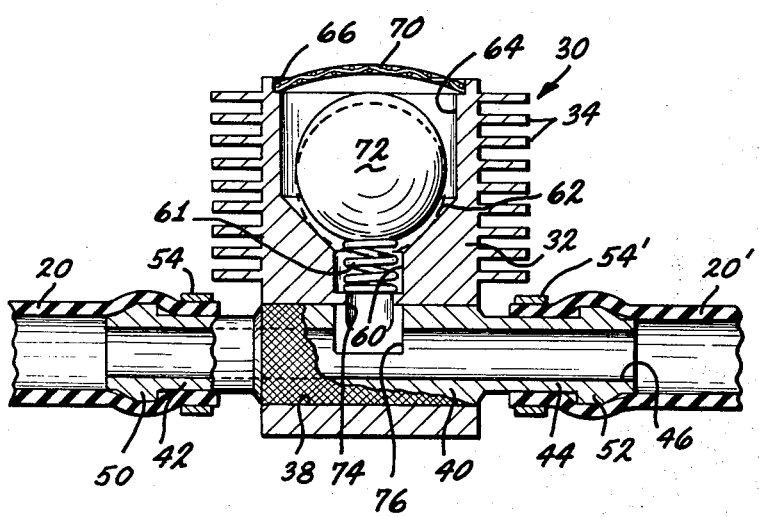
FIG. 3 is a sectional view taken along the line 3—3 of FIG. 2.

FIGS. 2 and 3 show a preferred form of the air admission valve 30. The air valve comprises a body 32 made of a suitable material which is in the form of a hollow, cylindrical casing having external radial vanes 34 as shown which are spaced apart axially. The lower part of the body 32 has a transverse cylindrical bore 38 through it and received in this bore with a press-fit is tubular member 40 which has end parts 42 and 44 of smaller diameter forming nipples as shown. Tubular member 40 has a bore 46. The nipples 42 and 44 have annular end ribs 50 and 52 as shown. The tube portions 20 and 20' may be flexible. These tubes have end parts which fit over the ribs 50 and 52 as shown. Then, the ends may be clamped by flexible clamping band members as designated at 54 and 54'.

The body 32 has a bore 60, a tapered or conical counterbore 62 which forms a valve seat, and a larger upper counterbore 64. At the end of the counterbore 64 is a further counterbore 66 which receives the peripheral edges of the screen member 70. Numeral 72 designates a ball valve which is in the counterbore 64 and may seat on the valve seat formed by the conical counterbore 62. The screen 70 permits free entry of air into the body or casing 32 and prevents entry of foreign matter of a size that might prove detrimental to the function of the device. Preferably, the screen 70 is firmly staked in place and further serves to retain the ball 72 within the casing body 32 when the spring 61 is extended. The bore 60 can communicate with the bore 46 in the tubular member 40 by way of a slot opening 74 in the body 32 and a slot opening 76 in the side of the body 40.

From the foregoing, the operation of the system as described with the air admission valve in it will be readily understood by those skilled in the art.

In operation, when the vacuum drawn by the engine and/or the frictional air force is sufficiently high, the ball 72 closes the orifice or bore 60; and at intermediate conditions, the ball 72 takes intermediate valving positions to provide a controlled amount of auxiliary air to be admitted to the engine by being admitted to the line 20. The admission of auxiliary air to the combustion chambers depends upon the magnitude of the vacuum created by the engine and upon the frictional force of the air moving around the ball 72 and provides for better performance of the engine. Since the air passing through the conduit 20 is relatively warm and the temperature of the external air, augmented by the engine fan in passing across the external vanes 34 of the body 32, is somewhat cooler, this temperature differential results in small amounts of condensation which in turn contribute to more efficient and smoother operation of the engine at all speeds. Vanes 34 are able to radiate heat and inasmuch as the air passing over them is cooler than the air in conduit 20, some heat exchange occurs with cooling of body 32 which can cause moisture in the air passing through the valve to condense, which has a cooling effect. This cooler air cools the fumes passing to the engine through conduit 20. This cooling of these fumes improves engine performance and the anti-pollution characteristics and capabilities of the system.

The following is a table of typical exemplary valve and spring characteristics for various horsepowers of vehicles. The spring might have an unstressed length of 0.3 inch and a working length of 0.205 inch.

| Vacuum | Spring Loading | Horsepower |
|---|---|---|
| 4–6 in/hg | 84 grams (0.185 lb) | to 150 |
| 8–10 in/hg | 145 grams (0.319 lb) | 150–250 |
| 12–14 in/hg | 218 grams (0.479 lb) | 250 |

As may be seen at larger horsepowers, a higher vacuum is drawn. Typically, when accelerating, the valve closes and then opens; and over the range of power and speed, the valve meters the air admitted which improves gas economy, combustion, and mitigating pollution by the effluents. The construction of the valve is that it will not stick and is able to meter the air admitted.

Since the internal fumes from the engine pass through the pollution control valve and hence through the tubular member 40 which is part of the valve 30 and then into the manifold, the addition of auxiliary air contributes to the improved combustion of such fumes; and thereby, reduction of the amount of polluting contaminants expelled by the exhaust system results.

From the foregoing, those skilled in the art will readily understand the nature and the construction of the invention and the manner in which it achieves and realizes all the objectives and advantages as set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. In an internal combustion engine system having a crankcase, an air inlet manifold and carburetor for admitting air to the manifold; a tubular connection from the crankcase to deliver gasses from the crankcase back to the inlet of the engine, said tubular connection having in it a pollution control valve; the improvements comprising an air inlet valve positioned to admit outside air into said tubular connection, said air inlet valve embodying biasing means tending to urge it in an opening direction and having a construction such that the degree of opening and the amount of air admitted is dependent upon the vacuum produced in said tubular connection, said air inlet valve including a body having heat radiating means whereby to produce a cooling effect on inlet air passing through said valve.

2. A system as in claim 1, wherein the air inlet valve is on the downstream side of the pollution control valve.

3. A system as in claim 1, wherein said air inlet valve includes a ball valve member, a conical valve seat, and a bore having a coil spring positioned in the bore and acting on the ball valve member.

4. A system as in claim 3, wherein the spring has a spring force such that for the horsepower of the engine the valve will open substantially to admit air under conditions of acceleration and under normal cruising conditions will meter a predetermined supply of additional air.

5. A system as in claim 4, wherein the bore and the coil spring have sizes such that the spring is readily replaceable by springs having different spring force so as to accommodate the air valve to engines having greater horsepower and which produce higher conditions of vacuum under acceleration.

* * * * *